(12) United States Patent
Asano et al.

(10) Patent No.: US 7,373,444 B2
(45) Date of Patent: *May 13, 2008

(54) SYSTEMS AND METHODS FOR MANIPULATING ENTRIES IN A COMMAND BUFFER USING TAG INFORMATION

(75) Inventors: Shigehiro Asano, Yokosuka (JP); Tsutomu Ishii, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 204 days.

This patent is subject to a terminal disclaimer.

(21) Appl. No.: 11/106,791

(22) Filed: Apr. 15, 2005

(65) Prior Publication Data

US 2006/0236008 A1 Oct. 19, 2006

(51) Int. Cl.
*G06F 13/00* (2006.01)
(52) U.S. Cl. ........................ 710/110; 710/310
(58) Field of Classification Search ........ 710/110–112, 710/310, 312; 711/202–203
See application file for complete search history.

(56) References Cited

U.S. PATENT DOCUMENTS

| | | | |
|---|---|---|---|
| 5,537,570 A * | 7/1996 | Tran | 711/128 |
| 5,784,590 A | 7/1998 | Cohen et al. | |
| 5,832,241 A * | 11/1998 | Guy et al. | 710/112 |
| 5,897,656 A | 4/1999 | Vogt et al. | |
| 6,014,734 A | 1/2000 | Tran et al. | |
| 6,112,019 A | 8/2000 | Chamdani et al. | |
| 6,240,479 B1 | 5/2001 | Snyder et al. | |
| 6,360,308 B1 | 3/2002 | Fechser | |
| 6,490,642 B1 | 12/2002 | Thekkath et al. | |
| 6,493,776 B1 | 12/2002 | Courtright et al. | |
| 6,636,906 B1 * | 10/2003 | Sharma et al. | 710/22 |
| 6,658,520 B1 * | 12/2003 | Bennett | 710/312 |
| 6,728,790 B2 * | 4/2004 | Ennis | 710/5 |
| 6,732,208 B1 * | 5/2004 | Alsaadi et al. | 710/112 |
| 6,772,383 B1 * | 8/2004 | Quach et al. | 714/746 |
| 6,820,165 B2 * | 11/2004 | Pannell | 710/313 |
| 7,127,562 B2 | 10/2006 | Dieffenderfer | |
| 2006/0190647 A1 * | 8/2006 | Asano et al. | 710/110 |
| 2006/0190655 A1 * | 8/2006 | Kautzman et al. | 710/306 |
| 2006/0230205 A1 * | 10/2006 | Asano et al. | 710/110 |

* cited by examiner

*Primary Examiner*—Raymond N Phan
(74) *Attorney, Agent, or Firm*—Law Offices of Mark L. Berrier

(57) ABSTRACT

Systems and methods for facilitating the location of entries in a buffer where a slave device stores information related to an active transaction so that the entries can be removed if the corresponding transactions are canceled. In one embodiment, multiple master devices and multiple slave devices are coupled to a split transaction bus. When a read command is received by a target slave device, the slave device generates an acknowledgment if the slave's command buffer has available entries, or a retry reply if the slave's command buffer is full. The acknowledgment includes a tag which is an index to the buffer location in which the command is stored. If a combined response to the command which is received by the slave device is a retry, the tag, which is included therein, is used by the slave to clear the command from its command buffer.

20 Claims, 7 Drawing Sheets

SYSTEMS AND METHODS FOR MANIPULATING ENTRIES IN A COMMAND BUFFER USING TAG INFORMATION

CROSS-REFERENCE TO RELATED APPLICATIONS

This application is related to U.S. patent application Ser. No. 11/063,174, entitled "System And Method For Facilitating Communication Between Devices On A Bus Using Tags", by Asano, et al., filed on Feb. 22, 2005, which is incorporated by reference as if set forth herein in its entirety.

BACKGROUND OF THE INVENTION

1. Field of the Invention

The invention relates generally to systems and methods for facilitating communication on a bus between master and slave devices. More particularly, the invention relates to systems and methods for facilitating the clearing of entries from a command buffer when transactions associated with the commands are canceled.

2. Related Art

Many of today's high-performance systems include multiple processors that share the computation load. In many multiple processor systems, some of the processors are set up as master devices and some of the processors are set up as slave devices. The master devices typically control the slave devices by sending data to and reading data from the slave devices through write and read commands. Communication between master and slave devices in such systems is typically accomplished with one or more busses. Busses have limited bandwidth that must be shared by all the devices on the bus, and thus, the implemented communication scheme over the busses should be as efficient as possible.

The transactions that are associated with each of the commands generated by a master device to facilitate data transfers typically require more than one phase or step to complete. For example, a write transaction requires the generation of a write command, a determination by the master device whether the slave device can accept the command, and the sending of data to be written to the slave device when the slave device indicates that it can accept the data. To increase the communication efficiency, multiple transactions may be in progress concurrently. That is, after a first command is generated by a master device and while execution of that command is still in progress, one or more additional commands may be generated by the master device or by other master devices.

A scheme is thus required to facilitate the association of the different phases of a transaction with each other since multiple transactions may be in progress concurrently. One such scheme involves the tagging of each communication with a tag that is unique-to each transaction. In a tagging scheme, after a command is generated by a master device, the command and a tag associated with the command are stored in a buffer. The tag is used to identify the command in the buffer until the transaction associated with the command is complete.

The tag is communicated with the command to the slave devices and the slave devices communicate the tag back to the master device with the replies sent to the master devices. When the master device receives a reply, the master device can determine the transaction with which the communication is associated by using the tag to identify the associated command in the buffer.

Because a master device assigns the tags to the commands in the buffer, the tags can be assigned in a way that minimizes the cost associated with using the tags to look up entries in the buffer. In particular, the tags can be assigned in such a way that they correspond to the physical locations of the corresponding commands in the buffer. For example, tag 1 may correspond to the first location in the buffer, and so on. The tags can then be used to index into the buffer rather than having to compare them to each of the tags in the buffer to determine the location of the corresponding command.

Slave devices can also use the tag generated by the master device as a way to associate phases of a transaction with each other. In the case of the slave devices, however, the tag is not an index into the buffer where information about the transactions in progress is stored. Slave devices can store the master tag and perhaps other information about the transactions in a buffer having a separate index. A content-addressable memory unit is thus typically required to associate incoming communications with previously received communications. A content-addressable memory unit can search through the contents in its memory to determine which, if any, of the entries stored in the memory (the previously received tags) match a specific value (the current tag). Content-addressable memory units require more time to retrieve an entry compared to a more traditional, indexed buffer since a search of the contents of the content-addressable memory unit is performed each time an entry is to be retrieved. In addition, content-addressable memory units require more logic than traditional buffers and thus require more physical space on an integrated circuit thereby increasing the cost of manufacturing.

Because of the cost associated with content-addressable memories, it would be desirable to provide a tag scheme that allows slave devices to more efficiently associate incoming communications with previously received communications.

SUMMARY OF THE INVENTION

One or more of the problems outlined above may be solved by the various embodiments of the invention. Broadly speaking, the invention includes systems and methods for facilitating the location of entries in a buffer where a slave device stores information related to an active transaction so that the entries can be removed if the corresponding transactions are canceled.

In one embodiment, a system includes one or more master devices and one or more slave devices coupled to a split transaction bus. Transactions involving the master and slave devices, such as read operations, are carried out in multiple phases. When a read command is received by a target slave device, the slave device generates either an acknowledgment (if the slave's command buffer has available entries) or a retry reply (if the slave's command buffer is full.) If there is an available entry in the slave's command buffer, a tag which is an index to the available entry is assigned to the command. The acknowledgment includes the slave-generated tag. The acknowledgment is received by a combined response unit, along with replies from the other slave devices in the system. If any one of the replies is a retry reply, the combined reply unit generates a retry reply. Upon receiving the combined retry reply, the master device that generated the read command clears the command from its command buffer, and the slave device that acknowledged the command also clears the command from its own buffer. This is facilitated by the use of the slave-generated tag to index into the slave's command buffer.

An alternative embodiment comprises a method for facilitating the clearing of entries from a slave's command buffer. A read command is first generated by a master device to a slave device. The command is reflected to all of the devices connected to the bus. If the slave device which is the target of the command has no available entries in its command buffer, it generates a retry reply. This reply is combined with the replies of the other devices, and a combined retry reply is generated. When the combined retry reply is received by the master device, the command is cleared from the master's command buffer. If the target slave device has available entries in its command buffer, it generates an acknowledgment. The acknowledgment includes a slave-generated tag that is an index to the entry of the slave's command buffer in which the command is stored. The acknowledgment is combined with the replies of the other devices. If the combined reply is an acknowledgment, the read transaction proceeds. If the combined reply is a retry, the master device and the target slave device clear the command from their respective command buffers. The slave device locates the entry by indexing into its command buffer using the slave-generated tag.

The various embodiments of the present invention may provide a number of advantages over the prior art. For example, with respect to the embodiment described above, the need for a content-addressable memory unit is eliminated by assigning a tag that is an index to the buffer where the slave device stores the relevant information about transactions in progress. The information may be retrieved by indexing into the buffer. Similar advantages may be provided in other embodiments involving other types of devices.

BRIEF DESCRIPTION OF THE DRAWINGS

Other objects and advantages of the invention may become apparent upon reading the following detailed description and upon reference to the accompanying drawings.

Figure 1:
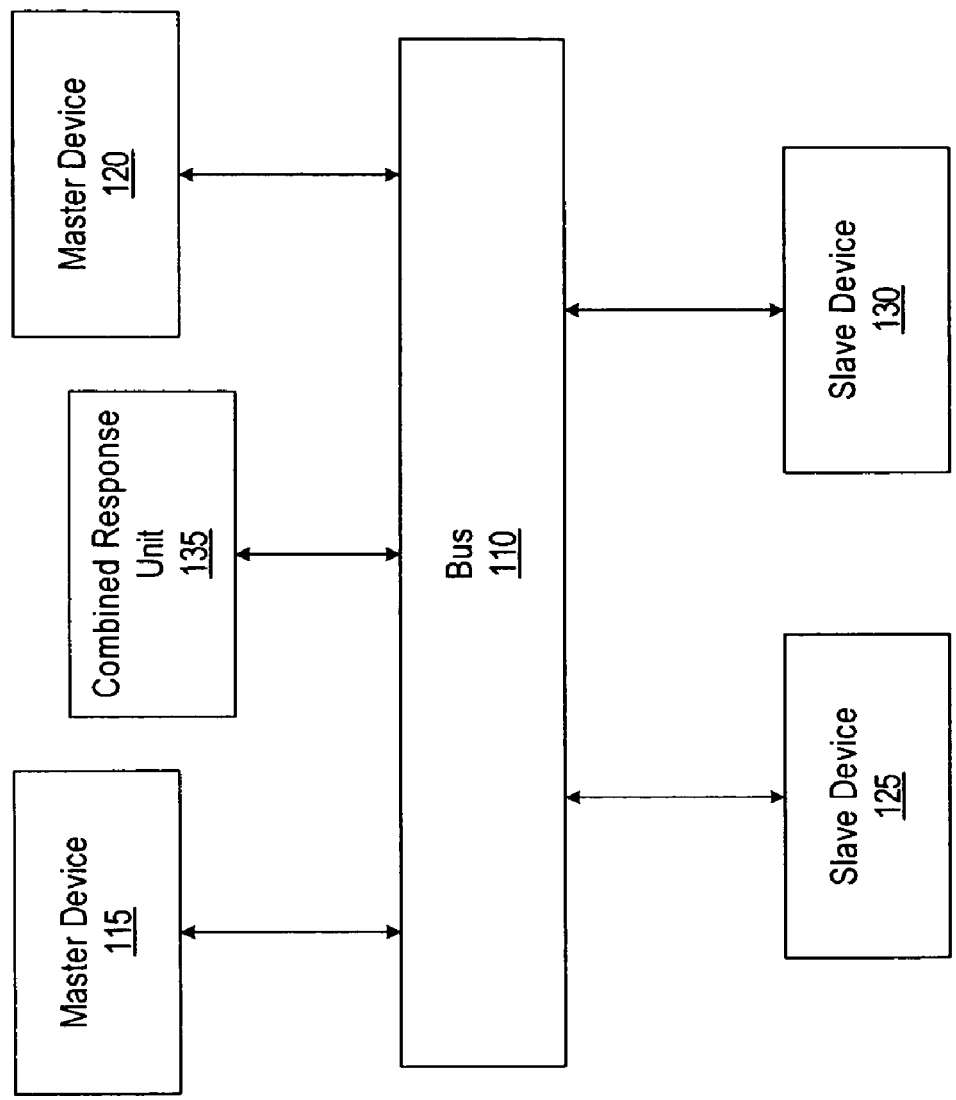
FIG. 1 is a block diagram illustrating a system having a bus that connects devices that send and receive commands and data through the bus using a tag scheme in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment that is described. This disclosure is instead intended to cover all modifications, equivalents, and alternatives falling within the scope of the present invention as defined by the appended claims.

DETAILED DESCRIPTION OF EXEMPLARY EMBODIMENTS

One or more preferred embodiments of the invention are described below. It should be noted that these and any other embodiments described below are exemplary and are intended to be illustrative of the invention rather than limiting.

Broadly speaking, the invention includes systems and methods for facilitating the location of entries in a buffer where a slave device stores information related to an active transaction so that the entries can be removed if the corresponding transactions are canceled.

In one embodiment, a system includes one or more master devices and one or more slave devices coupled to a split transaction bus. Transactions involving the master and slave devices, such as read operations, are carried out in multiple phases. When a read command is received by a target slave device, the slave device generates either an acknowledgment (if the slave's command buffer has available entries) or a retry reply (if the slave's command buffer is full.)

If there is an available entry in the slave's command buffer, a tag which is an index to the available entry is assigned to the command. The acknowledgment includes the slave-generated tag. The acknowledgment is received by a combined response unit, along with replies from the other slave devices in the system. If any one of the replies is a retry reply, the combined reply unit generates a retry reply. Upon receiving the combined retry reply, the master device that generated the read command clears the command from its command buffer, and the slave device that acknowledged the command also clears the command from its own buffer. This is facilitated by the use of the slave-generated tag to index into the slave's command buffer.

The slave device using the tag received from the combined response unit can retrieve the command associated with the transaction by indexing into the buffer. The slave device can then remove the associated command and thus avoid having a duplicate of the same command in the buffer in response to the combined response being a retry. Because the slave device can efficiently retrieve the data from the buffer using the slave-generated tag as an index to the buffer, content-addressable memory hardware that is required in conventional systems is not necessary.

It should be noted that the slave device may store a variety of information relating to the received read command and the corresponding read transaction in the command buffer. This information is not strictly limited to the command itself, and may include such information as a master-generated tag, an address from which data will be read, an amount of data to be read, and the like. References herein to storing the command in the read command buffer should therefore be construed to include storing any or all of this related information in the buffer.

While the invention is widely applicable to different types of systems, it is impossible to include all of the possible embodiments and contexts of the invention in this disclosure. The present disclosure therefore focuses on a few exemplary embodiments. It should be noted that these embodiments are intended to be illustrative rather than limiting. Upon reading this disclosure, many alternative embodiments of the present invention will be apparent to persons of ordinary skill in the art. All these alternative embodiments are within the scope of the appended claims.

In one embodiment, a first communication from a master device is received by a slave device. The first communication may be, for example, a read command with which the master device can receive data from the slave device. The slave device is configured to save the received command in the slave device's command buffer using a slave-generated tag, which is an index to the buffer. The first tag is selected from a list containing information indicating which tags are available (corresponding to those locations in the buffer that are not being used to store other commands at the time).

The slave device is configured to send a reply to the master device to indicate to the master device whether the slave device is available to accept the read command. The slave device may reply, for example, with an acknowledgement indicating that the slave device can retrieve the requested data, or with a retry indicating that the master device should send the read command again at a later time. If the reply is a retry, the reply includes the master-generated tag that was received with the command so that the master device can index into its own buffer to clear the command. The master device may retry the command at a later time. If the reply is an acknowledgement, the reply includes the master-generated tag that was received with the command (so that the master device can index into its own buffer to retrieve the associated command,) as well as the slave-generated tag. The acknowledgment is combined with replies from other devices. If one of the other replies is a retry, the combined reply is a retry (which includes the slave-generated tag.) In this case, the combined reply is received by the target slave device, which uses the slave-generated tag to index into the slave's command buffer. The command is then cleared from the buffer.

With respect to the embodiments described above, the need for a content-addressable memory unit in the slave device is eliminated by assigning a tag that is an index to the buffer where the slave device stores the relevant information about transactions in progress. The information may be retrieved by indexing into the buffer according to the tag. Similar advantages may be provided in other embodiments involving other types of devices.

Referring to FIG. 1, a block diagram illustrating a system having a bus that interconnects multiple master devices and slave devices in accordance with one embodiment is shown. In this embodiment, the master and slave devices are configured to interact to perform various transactions. For example, one of master device 115 and master device 120 may generate a write or a read command to one of slave devices 125 and 130. The master device may then send data to or receive data from the slave device. Slave devices 125 and 130 are configured to each send a reply after receiving the command. The reply can be an acknowledgment, a retry, or a null reply. An acknowledgment indicates that the slave device can accept or send data, a null indicates that the slave is not a participant in the transaction, and a retry indicates that the requested transaction cannot be completed at that time and that the master device needs to retry sending the command at a later time.

Combined response unit 135 is configured to receive the replies from all of the slave devices, combine the replies, and broadcast a single, combined reply to all of the devices connected to the bus (including master devices and slave devices.) In one embodiment, combined response unit 135 is configured to broadcast a retry combined response if the reply from one or more of the slave devices is a retry. The retry reply may be generated by a slave device that is a direct participant in the transaction (e.g., the target device to which data is written or from which data is read,) or by a slave device that is an indirect participant (e.g., a device that observes the transaction and updates locally stored information based upon the transaction.) In either case, the device is not ready for the transaction to proceed, so a retry reply is generated to delay the transaction.

In one embodiment, read and write transactions comprise multiple phases or steps. A write transaction, for example, may include, among others, phases where: a master device generates a write command; the master device sends the command to a slave device; the slave device determines whether it can accept the command; the slave device sends to the master device a response indicating whether the slave device can accept the command; the master device, in response to receiving an acknowledgement from the slave device, retrieves the data to be sent to the slave device from its local storage; the master device sends the data to the slave device; the slave device receives the data; and the slave device stores the data in its local storage.

Similarly, a read transaction may include, among others, phases where: a master device generates a read command; the master device sends the command to a slave device; the slave device determines whether it can accept the command; the slave device sends to the master device a response indicating whether the slave device can accept the command; the slave device sends the data to the master device; and the master device receives the data.

In one embodiment, a tag scheme may be used to associate the different phases of each transaction with each other. When generating a write or read command, for example, a master device is configured to generate a master tag (m-tag) that is associated with the generated command. The m-tag is sent to a slave device with the command and is then returned to the master device with any replies or data sent by the slave device. Using the returned m-tag, the master device can associate the received responses or data with the appropriate transaction. In one embodiment, the m-tag may be an index into a command buffer in the master device where information about the transaction (such as the originally generated command) is kept. By using the m-tag as an index, information about the transaction can be quickly retrieved.

The slave devices are configured to receive commands and m-tags from the master devices. In one embodiment, the slave devices are configured to generate slave tags (s-tags) for associating the different phases of transaction with each other. The slave devices are configured to include the s-tag with some of the responses the slave devices send to other devices (such as master devices and combined response units) so that these other devices can include the s-tag with subsequent communications which the other devices send to the slave devices. The s-tag is an index into a command buffer in the slave device that generated it. The command buffer is used by the slave device to store information about the transaction. By using the s-tag as an index, information about the transaction can be quickly retrieved by the slave device without the use of hardware such as a content-addressable memory unit.

Figure 2:
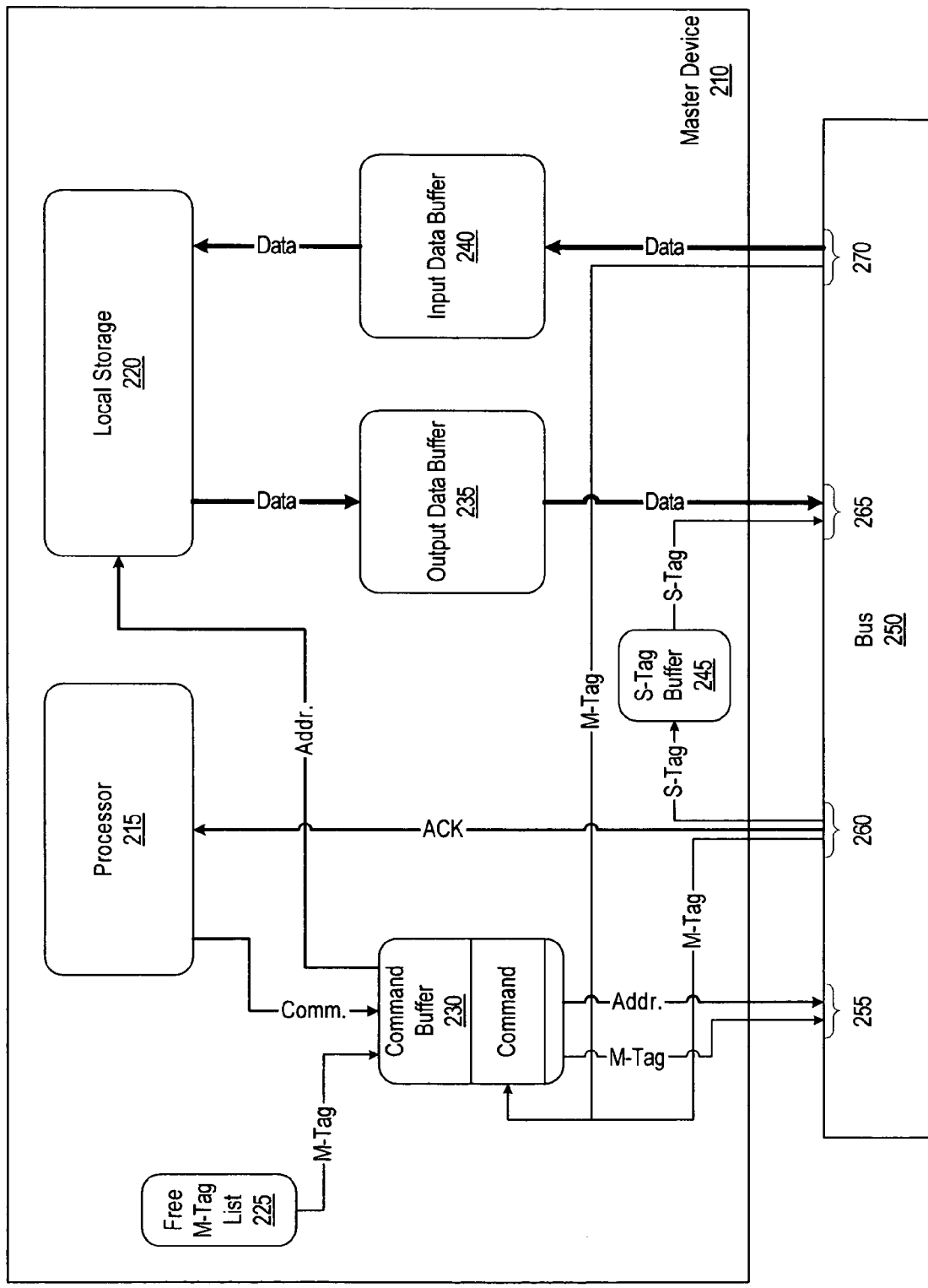
FIG. 2 is a block diagram illustrating a master device configured to generate write and read commands in order to send data to and receive data from slave devices through a bus using a tag scheme in accordance with one embodiment.

Referring to FIG. 2, a block diagram illustrating the structure of a master device configured to perform transactions using a tag scheme in accordance with one embodiment is shown. Master device 210 is configured to generate read commands in order to transfer data from a slave device over bus 250 to local storage 220. Master device 210 is also configured to generate write commands in order to transfer data from local storage 220 to a slave device over bus 250.

Master device 210 is configured to generate read commands with which master device 210 can retrieve data from slave devices over bus 250. In this embodiment, when processor 215 generates a read command, an available m-tag is obtained from free m-tag list 225. The m-tag is an index into command buffer 230. The command is stored in command buffer 230 at the location indexed by the m-tag until the transaction associated with the read command is complete. The command and the selected m-tag are then sent, through lines 255, to the slave device from which the data is to be read over bus 250.

If the slave device is not able to accept the read command, or if any of the other devices are not prepared for the read transaction to proceed, a retry response is generated by the combined response unit and sent to all of the devices on the bus, including master device 210. The retry combined response includes the m-tag that was originally generated by master device 210. When master device 210 receives the retry combined response, the m-tag is used as an index into command buffer 230 to locate and retrieve the command corresponding to the received response. After the command is located, the command is removed from buffer 230 so that there will not be duplicate read commands in buffer 230 when the command is later re-sent by master device 210.

If the slave device is able to accept the read command and all of the other devices are prepared for the read transaction to proceed, an acknowledgment is generated by the combined response unit and sent to master device 210 and all of the devices on the bus. Master device 210 then waits for the slave device to send the data corresponding to the read command. The data is sent by the slave device and is received by master device 210 through lines 270. In addition to the data, the slave device sends the m-tag. The m-tag is used by master device 210 to index into buffer 230 to locate the command corresponding to the received data. When the command is located, the command is retrieved from buffer 230 and the address stored with the command is sent to the master device's local storage 220 so that the received data can be stored at that address. The received data is first sent to input buffer 240 and then to the master device's local storage 220. In one embodiment, this completes the transaction associated with the read command.

Figure 3:
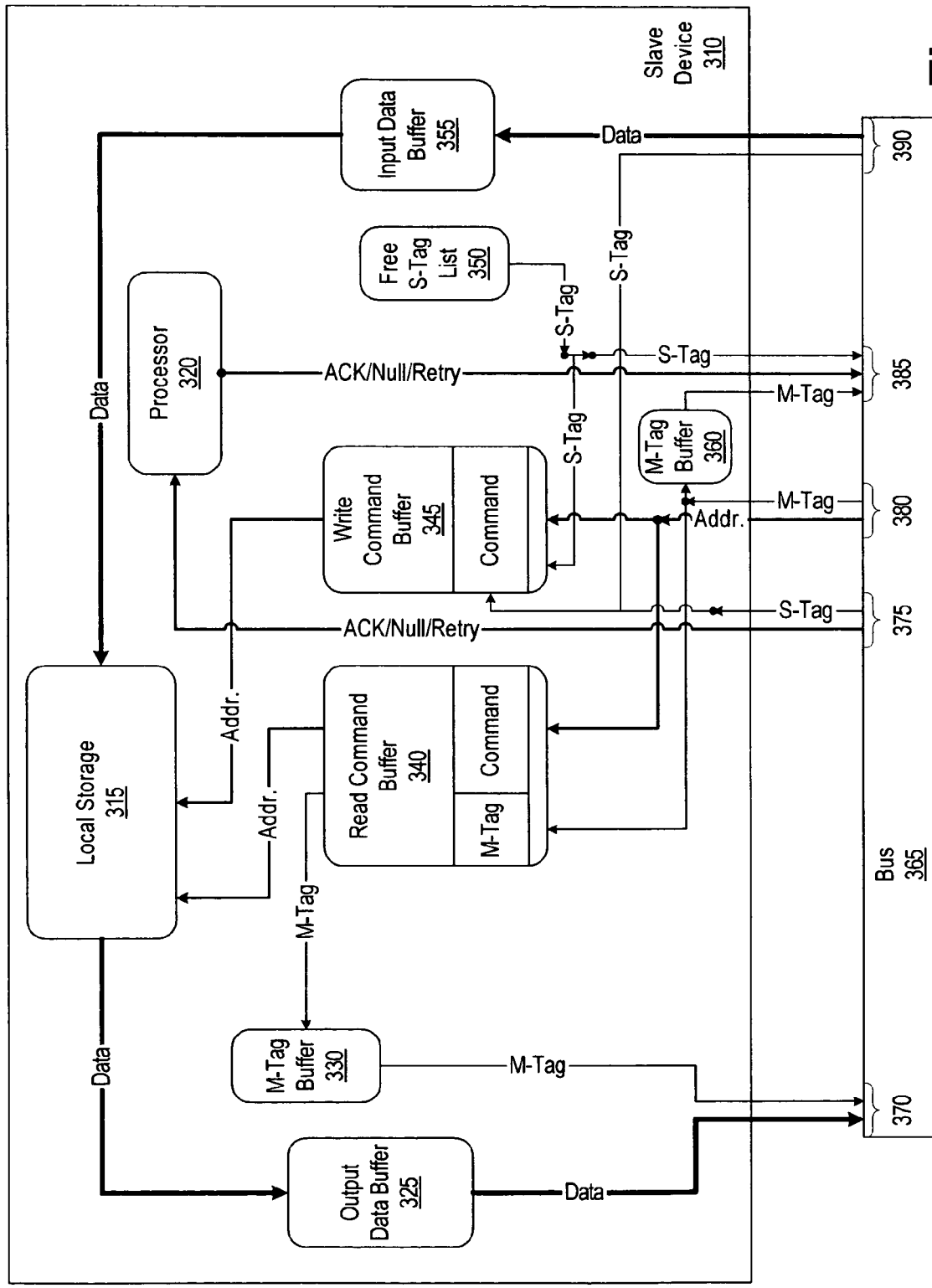
FIG. 3 is a block diagram illustrating a slave device configured to receive and send instructions and data from and to master devices over a bus using a tag scheme in accordance with one embodiment.

Referring to FIG. 3, a block diagram illustrating a slave device configured to receive data from and send data to master devices through a bus in accordance with one embodiment is shown. Slave device 310 is configured to receive write and read commands in order to receive and store data from a master device over bus 365 or to retrieve and send data to a master device over bus 365.

In one embodiment, slave device 310 is configured to receive read commands from a master device, through which the master device can read data from local storage 315. Slave device 310 is configured to receive a read command and the m-tag sent by a master device through lines 380. Slave device 310 is configured to determine whether read command buffer 340 can accept the received read command. If the read command buffer 340 is full, for example, slave device 310 is configured to send a retry reply to the master device (via the combined response unit.) When the master device receives the retry reply, it locates the corresponding read command in its command buffer and removes the command from the buffer. No further action is taken by the slave device with respect to this read command.

On the other hand, if the slave device's read command buffer 340 is not full, the received read command can be stored in the buffer. Slave device 310 therefore retrieves an s-tag from a free s-tag list 350 that contains information indicating which s-tags (and corresponding locations in buffer 340) are available. The read command is stored in read command buffer 340 using the assigned s-tag value as an index into the buffer. The m-tag which is received with the read command is stored in read command buffer 340 with the command. After slave device 310 stores the read command, the slave device is configured to send an acknowledgment reply to the master device indicating that the slave device is ready to proceed with the read operation. The acknowledgment reply contains the received m-tag and the s-tag that was assigned to the transaction by slave device 310.

As noted above, the other devices connected to the bus also receive the read command and provide their own replies to the master device. These devices will not send an acknowledgment, but they may send either a null reply or a retry reply. If one of these other devices is not involved in the read transaction and/or has no reason to prevent the transaction from occurring, it will send a null reply. If the device has a reason to prevent the transaction from proceeding (e.g. it needs to copy the read data for coherence reasons, but is not ready to do so,) it will send a retry reply. The replies of these other devices are combined by the combined response unit with the reply from slave device 310 to produce a combined response. If none of the devices generates a retry reply, the combined response will be an acknowledgment (since slave device 310 sent an acknowledgment.) If any of the devices generates a retry, the combined response will also be a retry. The combined response is forwarded by the combined response unit to all of the devices on the bus.

If the combined response is an acknowledgment, slave device 310 sees the combined acknowledgment on lines 375 and proceeds with the read transaction. When the read command reaches the "top" of read command buffer 340 the command/address is sent to local storage 315 so that the data to be sent to the master device can be retrieved from the identified address. The corresponding m-tag is sent to m-tag buffer 330. After the data is retrieved from local storage 315, the data is sent to output buffer 325. The data and the corresponding m-tag stored in m-tag buffer 330 are then sent through lines 370 and over bus 365 to the master device that requested the data.

If a retry combined response is received through lines 375 from a combined response unit that is also connected to the bus, slave device 310 is configured to locate and remove the corresponding read command from read command buffer 340 using the received s-tag as an index to the buffer. (As noted above, the s-tag was originally selected by slave device 310 to facilitate retrieval of the command and related information.) The read command is removed from read command buffer 340 to prevent the storage in the buffer of two identical read commands. Since the master device also receives the combined retry response, the master device will resend the original read command to the slave device.

In an alternative embodiment, a device on the bus may be both a master device and a slave device (master/slave device). In this embodiment, an additional identifier (e.g., a bit or bits) may included with the m-tag and the s-tag in order to indicate to a master/slave device receiving data whether the received data is intended for the master or slave portion of the device. For example, a 01 prefix may be assigned to m-tags and a 10 prefix may be assigned to s-tags. By examining a tag's prefix, a master/slave device can appropriately direct any data received with the tag to the master portion or to the slave portion of the device. The tags may again be used to associate different phases of a transaction with each other.

Figure 4:
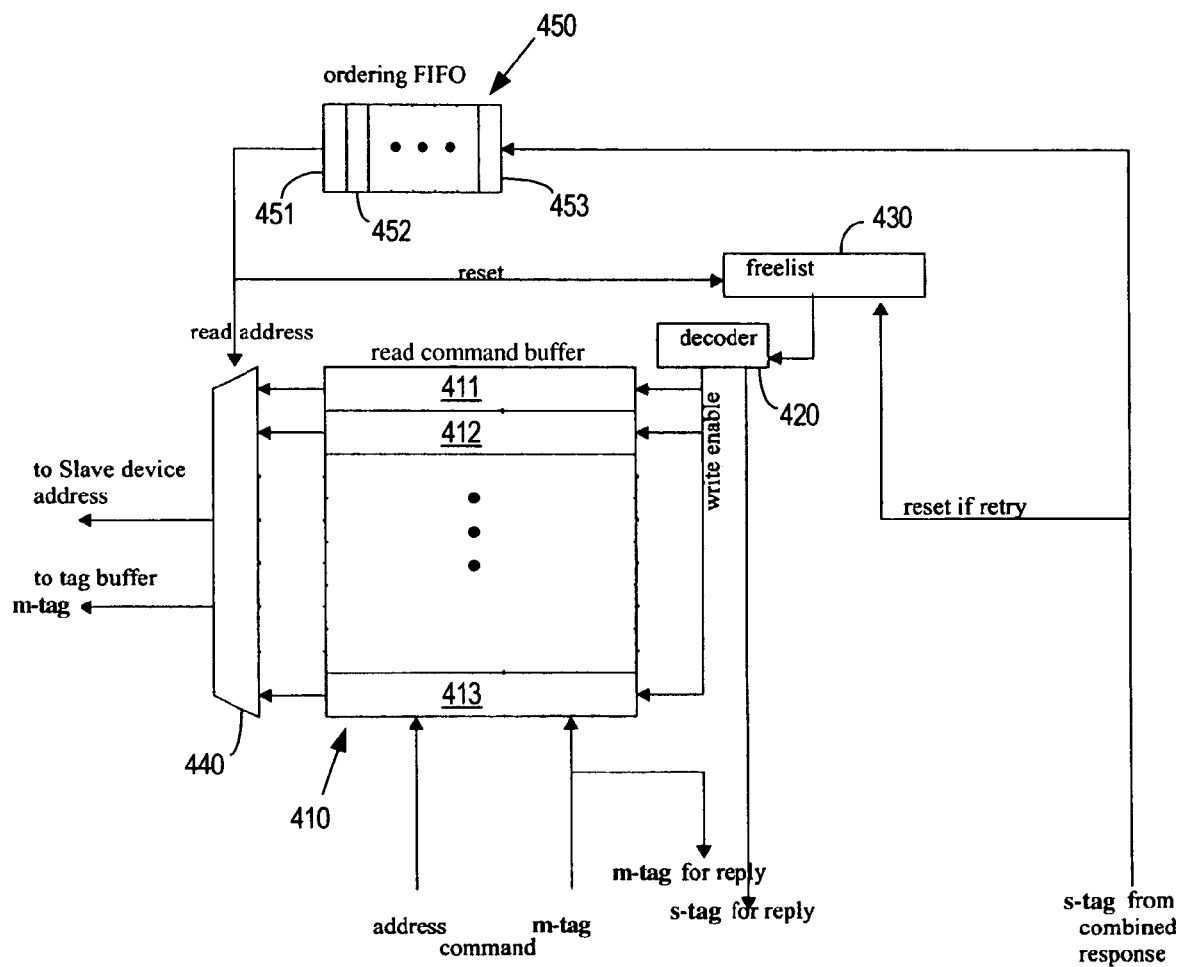
FIG. 4 is a diagram illustrating the structure of the read command buffer and related components of the client device in accordance with one embodiment.

Referring to FIG. 4, a diagram illustrating the structure of the read command buffer and related components of the client device in accordance with one embodiment is shown. In this embodiment, read command buffer 410 has multiple storage locations 411-413. Each of storage locations 411-413 is configured to store information associated with a read command that is stored therein, such as the address from which data will be read and the m-tag associated with the command. Storage locations 411-413 are addressed by a write enable signal provided by decoder 420. Decoder 420 receives the address of the particular storage location to which a command and associated information is written from freelist 430.

A selected one of storage locations 411-413 is read out of read command buffer 410 by multiplexer 440. Multiplexer 440 is controlled by a select signal is received from ordering FIFO 450. Ordering FIFO 450 includes multiple entries 451-453. As a command stored in read command buffer 410 is validated, a corresponding entry is placed in ordering FIFO 450. When each entry comes to the head of ordering FIFO 450, the entry is provided as a control input to multiplexer 440, causing the multiplexer to select a corresponding entry from read command buffer 410. The corresponding command information is thereby made available to allow the appropriate data to be read from the local memory and provided to the master device with the corresponding m-tag.

The read command buffer mechanism shown in FIG. 4 operates as follows. When a read command is a sent by one of the master devices and identified as being owned by the slave device, the address and m-tag associated with the command are stored in read command buffer 410. The particular location at which this information is stored is determined by freelist 430. Freelist 430 includes a set of s-tags, each of which corresponds to one of the storage locations in read command buffer 410.

One of the storage locations that is shown to be available is selected from freelist 430. The corresponding s-tag, which is an index of the corresponding location in the command buffer, is provided to decoder 420, which then enables the corresponding storage location so that the command information can be written into it. The s-tag is made available by decoder 420 to be included in the reply is generated by the slave in response to the received command. The m-tag originally received with the command is also included in the reply.

When a combined response corresponding to a read command is received by the slave device, the information in either read command buffer 410 or ordering FIFO 450 is updated. If the combined response is a retry, the s-tag that is included in the response is reset in freelist 430. In this embodiment, the information associated with the command does not need to be removed from read command buffer 410, because if the read command is not acknowledged in a combined response, no corresponding entry will be made in ordering FIFO 450, so the command will not be selected by multiplexer 440 for a read operation.

When the slave device receives a combined response acknowledging a read command, the s-tag is provided to ordering FIFO 450. When the s-tag is entered in ordering FIFO 450, the corresponding read command is effectively validated. In other words, at some point, the s-tag will reach the head of ordering FIFO 450 and will be provided to multiplexer 440, causing the now-valid command to be made available for a read operation.

Figure 5:
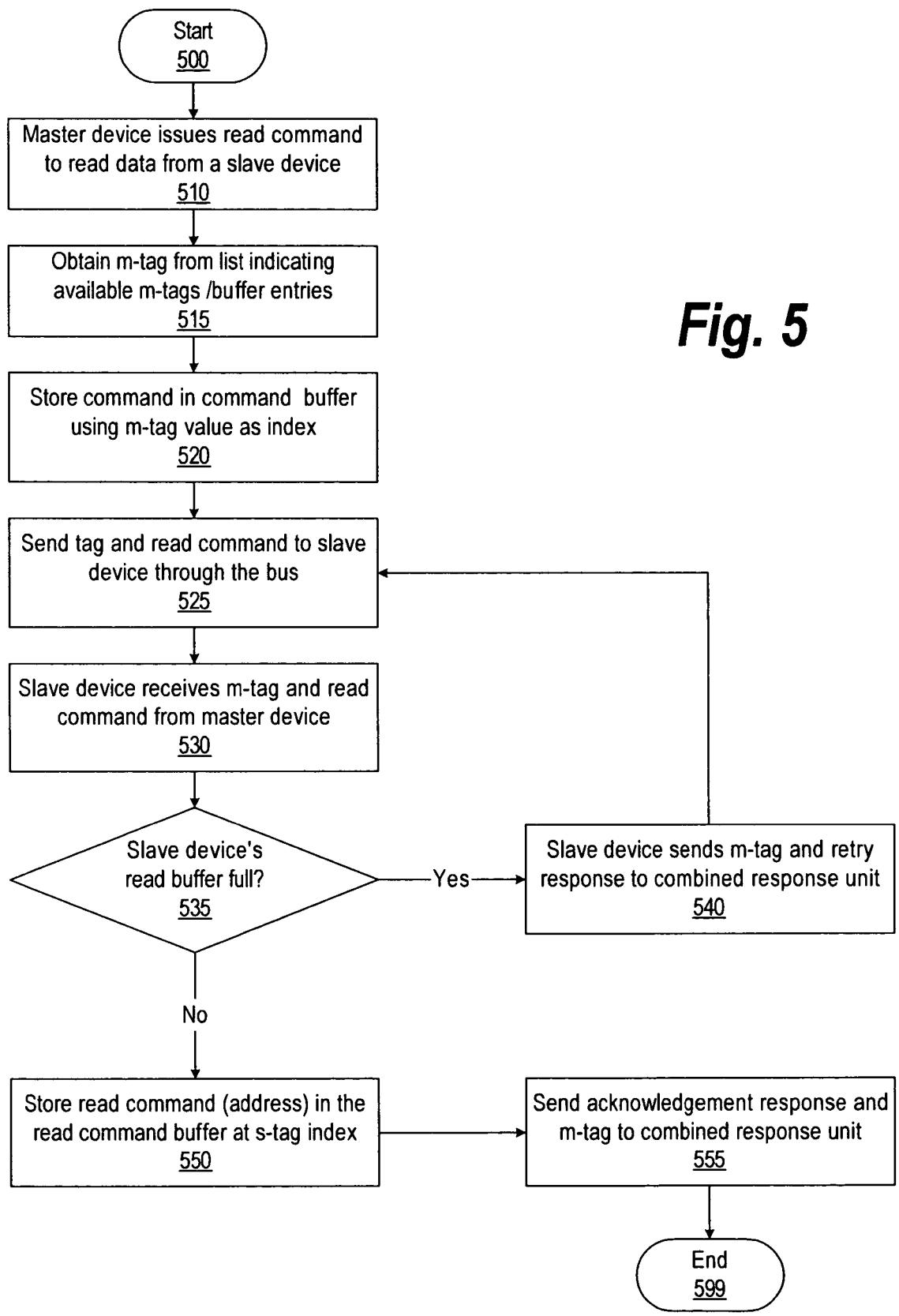
FIG. 5 is a flowchart illustrating a method by which a master device sends a read command to a slave device in accordance with one embodiment.

Referring to FIG. 5, a flowchart illustrating a method by which a master device sends a read command to a slave device in accordance with one embodiment is shown. Processing begins at 500 whereupon, at block 510, the master device generates a read command. A master device uses a read command, which includes a destination address, to transfer data from a slave device's local storage to the local storage of the master device. At block 515, an m-tag is obtained from a list containing information that indicates which of the m-tags (and corresponding buffer entries) are available. The m-tag is an index into a command buffer where the command is stored while the associated transaction is being processed. The command is removed from the buffer when the associated transaction is complete. At block 520, the command is stored in the command buffer using the m-tag value as an index, and at block 525, the command and the selected m-tag are sent to the slave device from which the data is to be read. Prior to requesting data, a master device determines whether the slave device is available to send the data.

At block 530, the slave device receives the m-tag and the read command sent by the master device. The slave device is configured to determine whether the slave device's read buffer is full at decision 535. If the buffer is full, decision 535 branches to the "yes" branch whereupon, at block 540, the slave device sends a retry response that also includes the received m-tag to the combined response unit. The combined response unit will include the m-tag in the retry response sent to the master device, which can then use the m-tag to associate the received response with the previously sent command so that the command can be resent at a later time. The slave device sends the retry response to indicate to the master device that the slave device is not currently available to accept the command sent by the master device.

On the other hand, if the slave device's read buffer is not full, decision 535 branches to the "no" branch whereupon, at block 550, the received command, which includes the address from which data is to be read, is stored in the read command buffer with the m-tag. The command is stored at a location in the read command buffer which is indexed in the buffer according to an s-tag which is associated with the command. The address contained in the command is the address where the slave device stores the data in the slave device's local storage. Then the slave device, at block 555, sends an acknowledgment response to the combined response unit, which will generate a combined response and forward this response to all of the devices, including the master device. In one embodiment, the acknowledgment response includes the m-tag and the s-tag. The m-tag is used by the master device to associate the response sent by the slave device with the previously sent read command. The s-tag is used by the slave device to associate the response with the previously sent read command in the event that the combined response is a retry, which will necessitate that the command be removed from the slave device's read command buffer.

Figure 6:
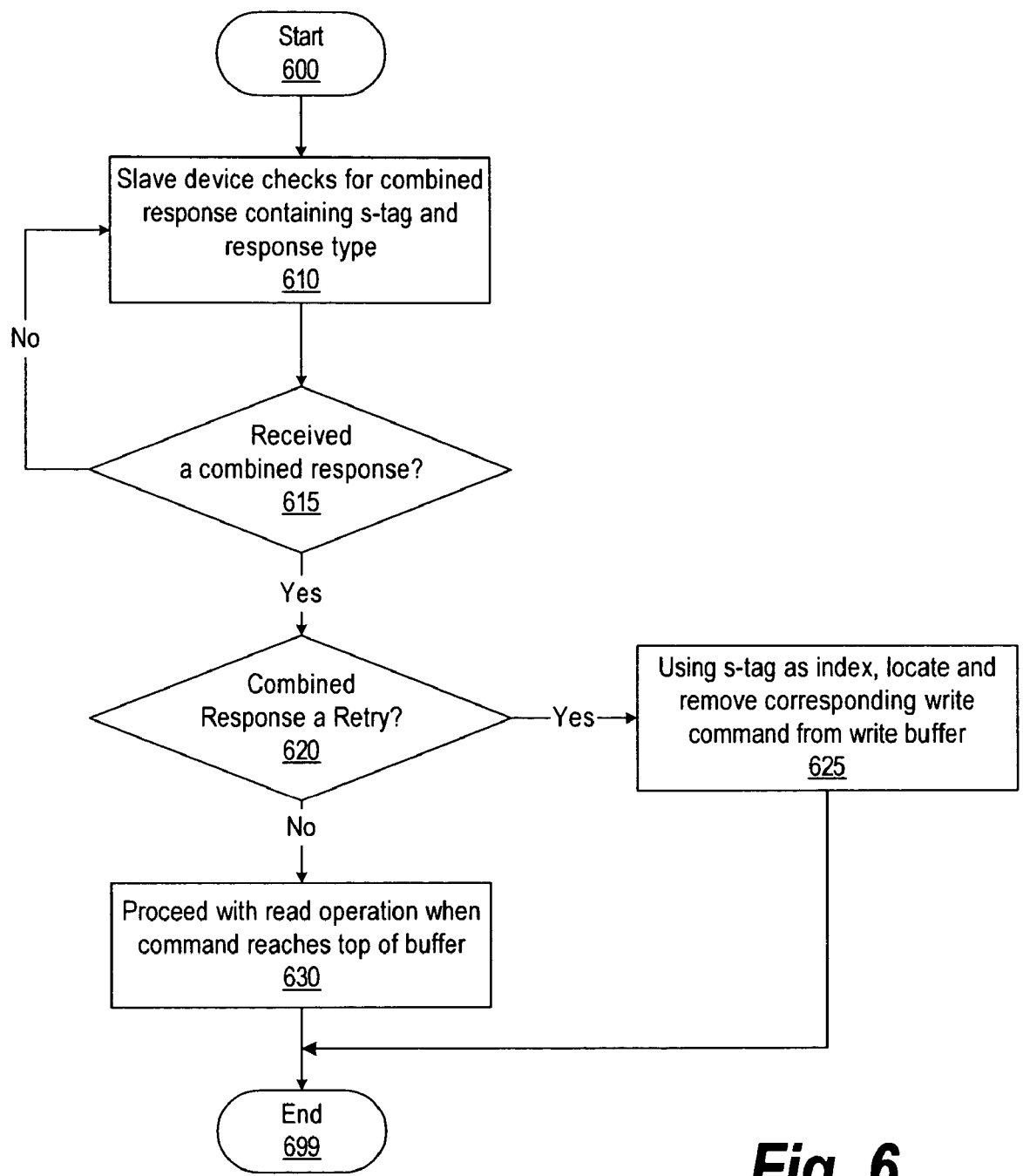
FIG. 6 is a flowchart illustrating a method for a slave device to process a combined read response received from a combined response unit in accordance with one embodiment.

Referring to FIG. 6, a flowchart illustrating a method for a slave device to process a combined read response received from a combined response unit in accordance with one embodiment is shown. Processing begins at 600 whereupon, at block 610, the slave device is waiting for a combined response to be received from a combined response unit. In this embodiment, it is assumed that the slave device has already sent to the bus an acknowledgment response to a master device's read command.

A determination is then made as to whether the slave device has received a combined response from the combined response unit. If a combined response has not been received, decision by 615 branches to the "no" branch whereupon processing loops back to block 610. The slave device therefore continues to wait for a combined response to be received. If a combined response has been received, decision 615 branches to the "yes" branch whereupon, at decision 620, a determination is made as to whether the combined response is a retry.

If the combined response is a retry, decision 620 branches to the "yes" branch whereupon, at block 625, using the received s-tag as an index to the read buffer, the read command corresponding to the retry response is located and is removed from the read buffer. The command is removed from the read buffer to prevent the storage in the buffer of two identical read commands. Since the master device also receives the combined retry response, the master device will resend the original read command to the slave device. Subsequently, processing of the combined read response ends at block 699.

If, on the other hand, the combined response is not a retry, decision 620 branches to the "no" branch whereupon at block 630 the slave device proceeds with the read operation. The method by which the slave device proceeds with the read operation is described in more detail in connection with FIG. 7. Processing of the combined read response then ends at block 699.

Figure 7:
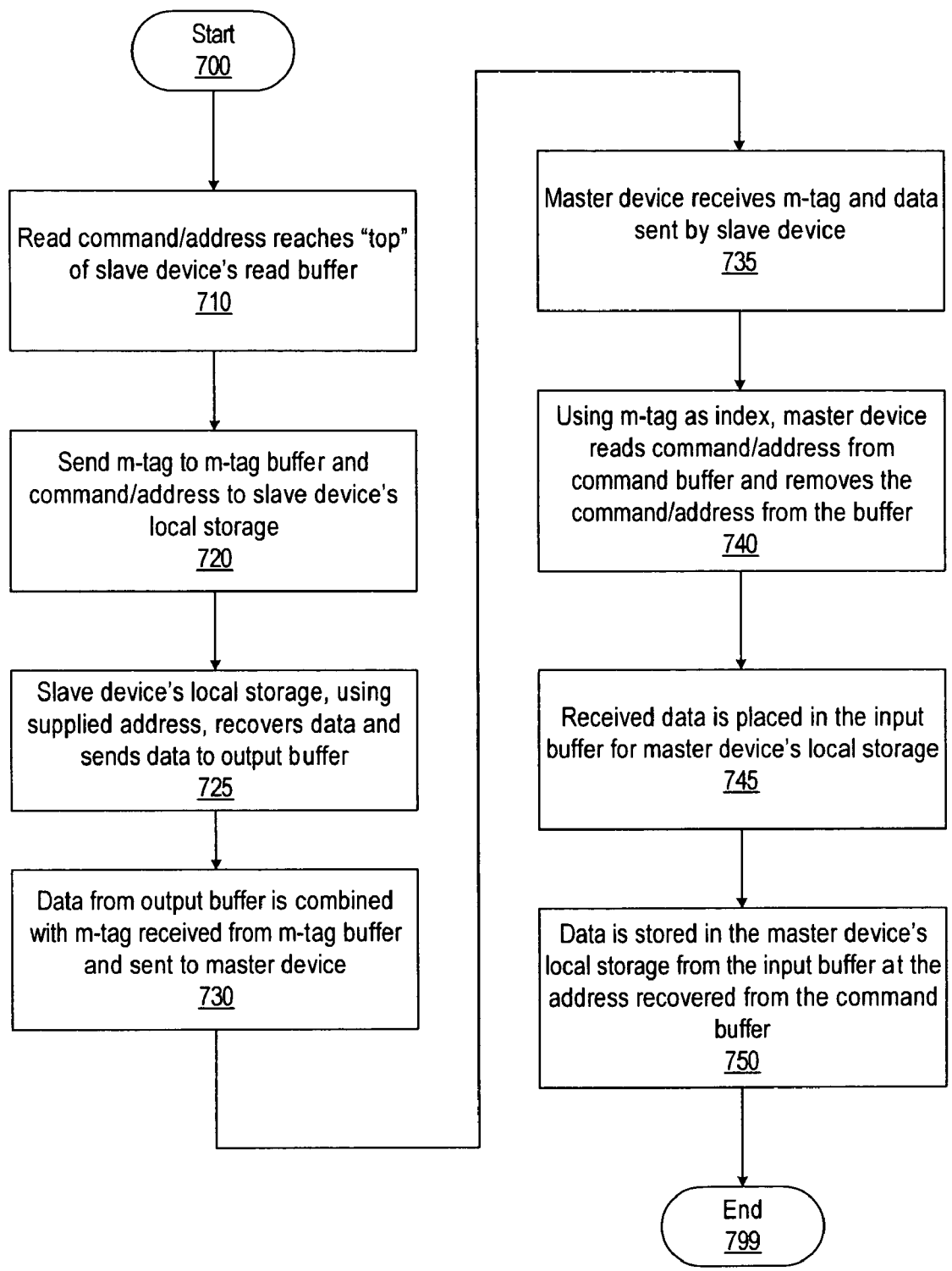
FIG. 7 is a flowchart illustrating a method by which a master device reads data from a slave device in accordance with one embodiment.

Referring to FIG. 7, a flowchart illustrating a method by which a slave device sends data to a master device in response to a read command in accordance with one embodiment is shown. Processing begins at 700 whereupon, at block 710, the previously stored read command reaches the "top" of the read command buffer. At block 720, the slave device stores the m-tag in an m-tag buffer and the recovered command/address is sent to the slave device's local storage so that the data to be sent to the master device is read. At block 725, the data read from the local storage is sent to output data buffer, and at block 730, the data is sent together with the corresponding m-tag from the m-tag buffer to the master device.

At block 735, the master device receives the data sent by the slave device and the m-tag that the master device had previously sent to the slave with the read command. At block 740, the m-tag is used as an index to the master device's command buffer to locate the command corresponding to the received data. When the command is located, the command is removed from the buffer and the address stored with the command is sent to the master device's local storage so that the received data can be stored at that address at block 740. At block 745, the received data is sent to an input buffer, and at block 750, the data from the input buffer is stored at the recovered address in the master device's local storage. At 799, the process of reading data from the slave device to the master device is completed.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To illustrate this interchangeability of hardware and software clearly, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with general purpose processors, digital signal processors (DSPs), application specific integrated circuits (ASICs), field programmable gate arrays (FPGAs) or other programmable logic devices, discrete gates or transistor logic, discrete hardware components, or any combination thereof designed to perform the functions described herein. A general purpose processor may be any conventional processor, controller, microcontroller, state machine or the like. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms 'comprises,' 'comprising,' or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method implemented in a first slave device that is coupled to one or more additional devices including at least one master device through a bus, the method comprising:
   the first slave device receiving a read command;
   the first slave device assigning a slave-generated tag (s-tag) value to the read command; and
   the first slave device storing the read command in a buffer in the first slave device at a location for which the s-tag value is an index value.

2. The method of claim 1, further comprising the first slave transmitting a reply to the read command to a master device, wherein the reply includes the s-tag value and a master-generated tag (m-tag) value.

3. The method of claim 2, wherein the m-tag value includes an identifier of the master device and the s-tag value includes an identifier of the first slave device.

4. The method of claim 2, further comprising one or more additional slave devices transmitting replies to the read command to the master device.

5. The method of claim 4, further comprising combining the replies of the one or more additional slave devices into a single combined reply and transmitting the combined reply to the master device, the first slave device and the one or more additional slave devices, wherein the combined reply includes the m-tag value and the s-tag value.

6. The method of claim 5, wherein when the combined reply comprises a retry reply, the slave device is configured to clear the command in the second buffer at the index of the s-tag value.

7. The method of claim 5, further comprising, when the combined reply comprises an acknowledgment, the slave device validating the read command.

8. The method of claim 7, wherein validating the read command comprises storing an entry corresponding to the read command in an ordering FIFO.

9. The method of claim 8, further comprising, when the entry corresponding to the read command reaches the head of the ordering FIFO, reading data from the local storage of the slave device and sending the data to the master device via the bus.

10. A system comprising:
    one or more slave devices coupled to a bus,
      wherein each slave device includes a processor and a slave command buffer, and
      wherein the processor is configured to
        receive a read command, and
        when there are one or more available locations in the command buffer,
          store the read command in one of the available locations,
          assign a slave tag (s-tag) value to the read command, wherein the s-tag value comprises an index to the location in the command buffer in which the read command is stored, and
          transmit a reply to the read command, wherein the reply includes an acknowledgment and the s-tag value.

11. The system of claim 10, wherein the processor is configured to store the read command with a master tag (m-tag) value that is received with the read command.

12. The system of claim 10, wherein, when the processor receives the read command and there are no available locations in the command buffer, the processor is configured to reply to the read command with a retry reply.

13. The system of claim 10, wherein the processor is configured to clear the read command that is indexed by the s-tag value from the command buffer when a retry combined reply associated with the read command is received.

14. The system of claim 10, wherein each slave device further comprises an ordering FIFO, and wherein the processor is configured to
    upon receipt of an acknowledgment combined reply, store an entry in the ordering FIFO corresponding to the command with which the acknowledgment combined reply is associated, and
    upon an entry reaching the head of the ordering FIFO, read data from a local storage according to the command associated with the entry at the head of the ordering FIFO.

15. The system of claim 13, further comprising a combined response unit configured to receive replies to the read command from the slave devices and to generate a combined reply based on the slave device replies.

16. The system of claim 15, wherein when any one of the slave device replies is a retry, the combined response unit is configured to generate a retry combined reply.

17. The system of claim 15, wherein when none of the slave device replies is a retry and one of the slave device replies is an acknowledgment, the combined response unit is configured to generate an acknowledgment reply.

18. A bus agent comprising:
    a processor;
    a master command buffer; and
    a slave command buffer;
    wherein the bus agent is configured to act as either a master or a slave in a read transaction;
    wherein when the bus agent acts as a slave, the processor is configured to
      receive a read command and a master tag (m-tag) value associated with the read command, and
      when there are one or more available locations in a corresponding slave command buffer,
        store the read command in one of the available locations,
        assign a slave tag (s-tag) value to the read command, wherein the s-tag value comprises an index to the location in the slave command buffer in which the read command is stored, and
        transmit a reply to the write command including an acknowledgment, the m-tag value and the s-tag value.

19. The bus agent of claim 18, wherein the processor is further configured to
    receive a combined reply from a combined response unit, and
    when the combined reply comprises a retry reply, to clear the command in the slave command buffer that is indexed by the s-tag value.

20. The bus agent of claim 18, wherein the processor is further configured to include an identifier in each m-tag and each s-tag identifying whether associated information is to be processed by the bus agent acting as a master or as a slave.

* * * * *